June 24, 1958 W. F. ASHWORTH 2,840,409
POST OFFICE FASTENER
Filed Sept. 24, 1956

INVENTOR:
WINTHROP F. ASHWORTH,
BY Robert E Ross
ATTORNEY.

United States Patent Office 2,840,409
Patented June 24, 1958

2,840,409

POST OFFICE FASTENER

Winthrop F. Ashworth, Wenham, Mass., assignor to United-Carr Fastener Corporation, Boston, Mass., a corporation of Delaware Application September 24, 1956, Serial No. 611,705

3 Claims. (Cl. 292—317)

This invention relates generally to fastening devices, and has particular reference to a snap fastener stud and socket assembly which is adapted for locking engagement.

In many instances it is desirable to provide means for sealing a mail bag, a lock hasp on a storage or shipping container or the like with a device which may be easily removed, yet which cannot be removed without destruction. Such devices are not used to prevent theft, but to indicate that the container has been tampered with.

Devices of this type have heretofore been found to have a number of disadvantages for certain applications, such as for use on mail bags, in that they are too expensive for use in large quantities, or require special tools for assembly. Devices which are cheap enough for use in large quantities usually are not strong enough in resisting lateral forces, or are not reliable, since they are not absolutely tamperproof or do not always engage properly when assembled.

The object of this invention is to provide a locking snap fastener assembly which overcomes the above disadvantages in that it is economical to manufacture, easy to assemble, and provides a reliable tamperproof assembly.

A further object of the invention is to provide a locking stud and socket assembly in which means is provided to insure that all of the flexible stud elements become engaged with the socket.

A further object of the invention is to provide a locking stud and socket assembly in which means is provided to prevent lateral forces applied thereto from affecting the locking action.

Other objects of the invention will be apparent to one skilled in the art from the following description of a specific embodiment thereof.

Figure 1:
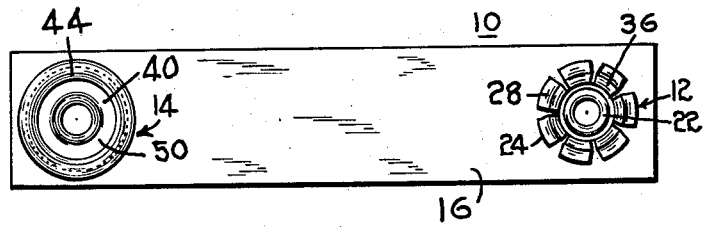
Fig. 1 is a top plan view of a fastener assembly embodying the features of the invention.
Figure 2:
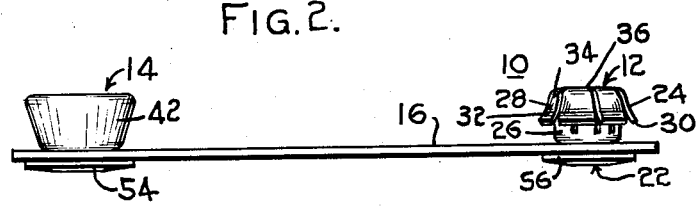
Fig. 2 is a view in side elevation of the assembly of Fig. 1.

Referring to the drawing, there is illustrated a locking fastener assembly 10, which comprises generally a stud 12 and a socket 14 assembled onto a flexible tape 16.

The stud 12 comprises generally a base 18 having an aperture 20 for receiving an attaching eyelet 22, and a series of flexible legs 24 extending forwardly from the outer periphery of the base. The legs 24 each comprise a forwardly extending flexible shank 26 and rearwardly extending free end portion 28 having rounded terminal ends 30. The free end portions 28 have rearmost portions 32 which are inclined outwardly to a greater degree than the foremost portions 34. The junction of the shanks 26 with the free end portions 28 forms an annular forwardly facing nose portion 36.

The socket 14 comprises a cup-shaped body having a base 40, an outwardly sloping peripheral wall 42 disposed on the base with a rim 44 on the upper edge of the wall which is curled inwardly and downwardly forming a peripheral recess 46. The base 40 is provided with an upwardly projecting medial portion 48 forming a peripheral recess 50 adjacent to the lower end of the wall 42. The height of the medial portion 48 is great enough so that the recess 50 is deeper than the recess 46 for a purpose to appear hereinafter. The upwardly projecting portion 48 may be provided with a central aperture 52 to receive an attaching eyelet 54.

The assembly 10 may be utilized to seal a bag or other container (not shown) by wrapping it around the neck thereof and snapping the stud into the socket, so that thereafter the bag cannot be opened without cutting the tape or destroying the fastener.

Figure 3:
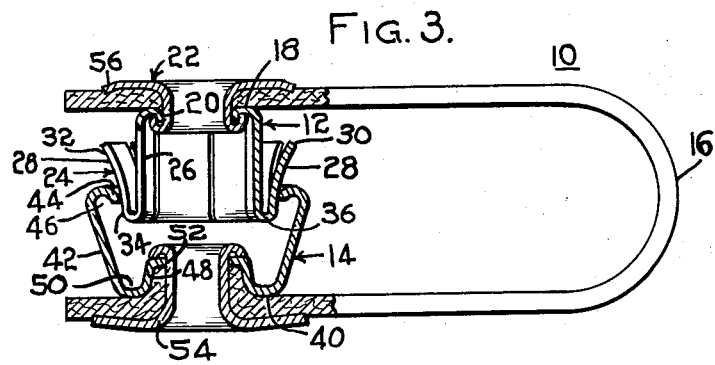
Fig. 3 is a view in side elevation, partly in section, of the stud and socket in position for locking engagement.
Figure 4:
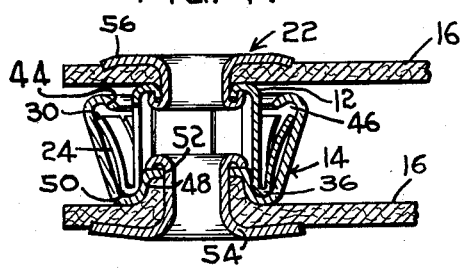
Fig. 4 is a view in side elevation, partly in section, of the stud and socket in locking engagement.

The nose portion 36 has an overall diameter which is less than the entrance to the socket formed by the inturned rim 44, so that when the stud is inserted into the socket, flexing of the legs 24 does not occur until the stud is a substantial distance into the socket. At the point of initial contact between the legs 24 and the rim 44, the legs have a relatively high degree of outward inclination, which tends to both center the stud in the socket and maintain it perpendicular in relation to the plane of the socket opening. (See Fig. 3.) Hence, further pressure applied to the assembly causes the stud to move into the socket, with the free ends of the legs flexing inwardly and snapping past the inturned rim 44 to spring outwardly against the inclined wall 42. The greater outward inclination of the rearmost portion of the legs, in properly aligning the stud in relation to the socket during the initial part of the assembly insures that the free end portions of the legs all snap past the inturned edge simultaneously. During the assembly, the shank portions 26 are also free to flex inwardly, thereby permitting a large amount of total inward movement of the free ends. This action permits a large difference in diameter between the entrance to the socket and the overall diameter of the free ends without causing permanent deformation of the legs during assembly. However, after assembly the nose portion 36 of the stud is disposed in the recess 50, and is supported internally by the upwardly projecting medial portion, thereby making the legs more rigid after engagement with the socket to resist lateral forces applied to the assembly. The inclination of the wall 42 permits the upper end thereof to be of a suitable size to engage the legs of the stud, yet permits the lower end to closely surround the nose portion of the stud to assist in resisting lateral forces.

Figure 5:
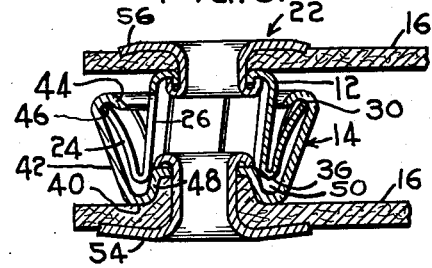
Fig. 5 is a view of the assembly of Fig. 4 showing the effect of disengaging forces applied thereto.

Referring to Fig. 5, there is illustrated the action of the parts when a separating force is applied to the assembly. As the stud tends to tilt and pull out of the socket in response to such forces, the free ends of the legs move upwardly and seat in the recess 46. Since the upwardly projecting medial portion 48 is higher than the depth of the recess 46, the nose portion 36 is still supported internally against lateral movement, so that the individual shank members cannot be forced sideways by a tool inserted into the socket in an attempt to release the free end portion from under the inturned rim.

In the preferred embodiment, the eyelet 22 used for attaching the stud to the tape has a flange 56 which is substantially as large as the socket entrance, thereby covering the socket entrance after assembly to prevent the insertion of picks or similar tools.

The construction of the stud and socket enables the assembly to withstand the forces involved in being wrapped about the neck of a mail bag to hold the bag tightly closed, without the locking action being affected. The parts are also economical to manufacture, and the stud and socket are easily snapped together by hand.

Since certain obvious changes may be made in the device without departing from the scope of the invention, it is intended that all matter contained herein be interpreted in an illustrative and not in a limiting sense.

I claim:

1. A locking snap fastener, comprising a sheet metal stud having a series of annularly arranged individual flexible legs with forwardly projecting flexible shank portions and free end portions extending from the forward end thereof which are bent outwardly and back to extend rearwardly alongside the shank portions, said free end portions being inclined outwardly from the shank portions to terminate in spaced relation thereto, and a sheet metal socket for receiving the stud in snapping engagement, said socket comprising a hollow cup-shaped body having a base and a peripheral wall disposed about the base, said wall extending outwardly from the base and terminating in a lip portion which is curled inwardly and downwardly toward the base forming a peripheral recess, and surrounding a stud entrance opening, said base having a peripheral groove formed therein adjacent to the wall which has a depth greater than the depth of the recess, the dimensions of the parts being such that when the stud is assembled into the socket, the free ends of the legs snap past the lip and spring outwardly against the inclined wall of the socket, said stud and said socket providing the only members of the locking snap fastener.

2. A locking snap fastener, comprising a stud having a peripheral series of individual flexible legs with forwardly projecting shank portions and free end portions extending from the forward end thereof which are bent outwardly and back to extend alongside the shank portions for a portion of their lengths substantially parallel to the shank portions, said free end portions being thereafter inclined outwardly from said shank portions to terminate in substantial radial spaced relation thereto, the junction of the shank portions with the free end portions forming a forwardly facing annular nose portion, and a socket for receiving the stud in snapping engagement, said socket comprising a hollow cup-shaped body having a base and a peripheral wall disposed about the base, said wall extending outwardly from the base and terminating in a lip portion which is curled inwardly and downwardly toward the base forming a peripheral recess and surrounding a stud entrance opening, said base having an upwardly extending center portion forming a peripheral groove adjacent to the wall which has a depth greater than the depth of the recess, the dimensions of the parts being such that when the stud is assembled into the socket, the free ends of the legs snap past the lip and spring outwardly against the inclined wall of the socket, and the annular nose of the stud rests in the recess and is closely surrounded by the wall to prevent appreciable lateral movement thereof.

3. A locking fastener as set forth in claim 2 in which free ends of the legs are curved longitudinally relative to the shank portions so that the rearmost portions of the free ends of the legs have an outward inclination greater than that of the foremost portion, the diameter of the stud about said foremost portion being less than that of the stud entrance opening, whereby when said stud is inserted into the socket, flexing of the arms occurs only after the rearmost portions thereof contact the inturned lip after the stud has entered a substantial distance into the socket, thereby insuring that the stud is in proper alignment with the socket so that all the free ends of the legs snap under the inturned edge of lip portion.

References Cited in the file of this patent;

UNITED STATES PATENTS

| 884,604 | Murray | Apr. 14, 1908 |
| 1,605,638 | Baruch | Nov. 2, 1926 |